(12) United States Patent
Kück et al.

(10) Patent No.: US 7,861,587 B2
(45) Date of Patent: Jan. 4, 2011

(54) DEVICE FOR MEASURING THE LEVEL OF A LIQUID IN A CONTAINER WITH AN ULTRASONIC TRANSDUCER

(75) Inventors: Thomas Kück, Weyhe (DE); Heiko Dobrinski, Bremen (DE); Andreas Buhrdorf, Bremen (DE)

(73) Assignee: Hella KGaA Hück & Co., Lippstadt (DE)

( * ) Notice: Subject to any disclaimer, the term of this patent is extended or adjusted under 35 U.S.C. 154(b) by 85 days.

(21) Appl. No.: 11/886,194

(22) PCT Filed: Mar. 14, 2006

(86) PCT No.: PCT/DE2006/000446

§ 371 (c)(1),
(2), (4) Date: Sep. 12, 2007

(87) PCT Pub. No.: WO2006/097076

PCT Pub. Date: Sep. 21, 2006

(65) Prior Publication Data

US 2008/0184794 A1 Aug. 7, 2008

(30) Foreign Application Priority Data

Mar. 18, 2005 (DE) .................... 10 2005 012 566

(51) Int. Cl.
*G01F 23/28* (2006.01)
(52) U.S. Cl. .................... 73/290 V
(58) Field of Classification Search ............... 73/290 V, 73/290 R
See application file for complete search history.

(56) References Cited

U.S. PATENT DOCUMENTS

| 4,656,384 | A | 4/1987 | Magori et al. |
| 4,984,449 | A | 1/1991 | Caldwell et al. |
| 5,379,658 | A | 1/1995 | Lichtenfels et al. |
| 5,568,449 | A | 10/1996 | Rountree et al. |
| 6,993,967 | B2 | 2/2006 | Forgue |

FOREIGN PATENT DOCUMENTS

| DE | 102 59 809 A1 | 7/2003 |
| DE | 103 31 566 A1 | 3/2004 |
| EP | 1 460 396 | 9/2004 |

OTHER PUBLICATIONS

International Search Report.

*Primary Examiner*—Hezron Williams
*Assistant Examiner*—Alex Devito
(74) *Attorney, Agent, or Firm*—Collard & Roe, P.C.

(57) ABSTRACT

The invention relates to a device for measuring the level of liquid in a container by means of an ultrasonic converter, comprising an ultrasonic converter which is disposed at a distance from the base such that it radiates towards the surface of the liquid and also towards a lower reflector. The ultrasonic converter is, preferably, integrated into a housing which has a large upper opening and a small lower opening. A cavity is arranged in the base of the device below the lower opening.

13 Claims, 3 Drawing Sheets

…

Figure 1:
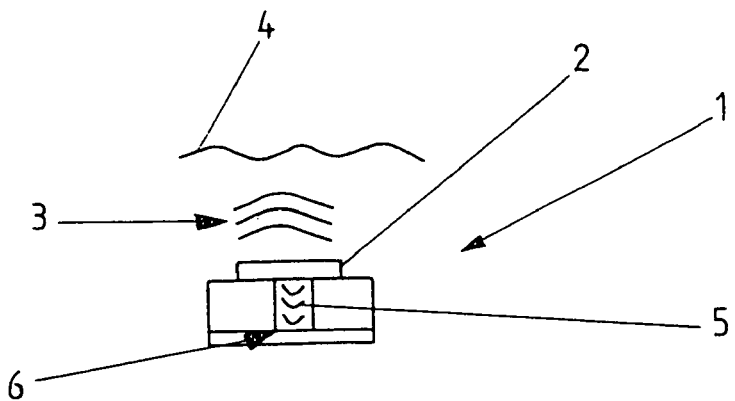

DEVICE FOR MEASURING THE LEVEL OF A LIQUID IN A CONTAINER WITH AN ULTRASONIC TRANSDUCER

CROSS REFERENCE TO RELATED APPLICATIONS

Applicants claim priority under 35 U.S.C. §119 of German Application No. 10 2005 012 566.2 filed Mar. 18, 2005. Applicants also claim priority under 35 U.S.C. §365 of PCT/DE2006/000446 filed Mar. 14, 2006. The international application under PCT article 21(2) was not published in English.

The invention relates to device for measuring the level of a liquid according to the ultrasound-echo principle in a container with an ultrasonic transducer, wherein the ultrasonic transducer is disposed at a distance from a reflecting surface disposed in the bottom region and is designed on the one hand for irradiation to the liquid surface and on the other hand to the reflecting surface.

Such a device is known for example from EP 1 460 396. In this device, the evaluation takes place by the fact that echo signals split into peaks are detected as a result of multiple reflections at the liquid surface and in the region of the container bottom and that the time intervals of the peaks resulting from the determined distance are evaluated to determine the sound velocity in the liquid.

The problem underlying the invention is to provide a device of the type mentioned at the outset, which is constructed particularly simply and permits a particularly reliable measurement according to the ultrasound-echo principle.

The solution to this problem takes place with a device with the features of claim 1. Advantageous developments of the invention are given in the sub-claims.

In a device for measuring the level of a liquid according to the ultrasound-echo principle in a container with an ultrasonic transducer, wherein the ultrasonic transducer is disposed at a distance from a reflecting surface disposed in the bottom region of the container and is designed on the one hand for irradiation to the liquid surface and on the other hand to the reflecting surface, it is essential to the invention that a sunken portion in the bottom is disposed beneath the ultrasonic transducer. The bottom of the container, more precisely the bottom inside this sunken portion, then serves as a reflecting surface or reflector. The sunken portion defines a reference distance. It is thus possible to use a fixed reference distance for the comparative measurement and to form the reference distance independently of the actual measuring distance and in this way to achieve a situation where the two measurements mutually influence one another as little as possible.

An ultrasonic transducer is understood to mean any device for the conversion of a signal into an ultrasonic oscillation and vice versa. The ultrasonic transducer is preferably used as a transmitter and as a receiver. It is however also conceivable to use the ultrasonic transducer according to the invention solely as a transmitter and to use a receiver structurally separated therefrom. The ultrasonic transducer is preferably designed as a piezoelectric transducer. In particular, piezoelectric ceramics or also piezoelectric crystals are used for this. In another preferred embodiment of the invention, the transmitter and the receiver and preferably also an evaluation unit are integrated into a component. This component is preferably a housing, in which an integrated switching circuit, in particular an ASIC in the present case, is disposed. The housing is preferably made from a plastic material or a polymer.

In another embodiment of the invention, the transmitter is disposed in a component which has a recess with openings above and below. In a preferred embodiment of the invention, the device transmits the ultrasound with a greater power above than below. For this purpose, housing adaptations are preferably undertaken, in particular different size openings are provided above and below in the housing. Other adaptations are feasible, such as for example the type of installation of the ultrasonic transducer in the housing or the use of damping elements. For this purpose, the lower opening in the housing, i.e. the one directed towards the reference distance, is smaller than the upper opening, i.e. the one directed towards the liquid surface. Provided in the housing is a recess, into which the ultrasonic transducer, or in particular a piezocrystal, is preferably inserted from above in a form-fit manner. Alternatively, the ultrasonic transducer can be mounted on a metal frame, in particular a pressed screen or "lead frame" and then enveloped or encapsulated with a plastic material. For better decoupling of the ultrasound, the surface of the ultrasonic transducer element can be excluded from the housing material. For this purpose, a production technology is used wherein the whole active surface of the ultrasonic transducer or at least partial regions thereof are kept free from the housing material. The lower as well as the upper opening are preferably dimensioned according to the radiated power, whereby the upper opening directed towards the liquid surface preferably has the same size as the ultrasonic transducer or more precisely its active surface, in order to achieve a maximum transmission power. A device for temperature detection is preferably also provided in the component itself. This is preferably designed as an ASIC with a temperature detection. Also disposed in the housing are passive electrical components, such as capacitors, resistors, diodes, transistors, varistors and/or coils.

The integrated switching circuit, in particular the ASIC, also serves for signal control and processing of the received signals. The housing, which can also be referred to as a multichip module, is also preferably coated, in order to guarantee liquid resistance, especially oil resistance, of the sensor elements or the ultrasonic transducer.

According to the invention, a sunken portion in the bottom of the device is provided beneath the ultrasonic transducer. By this means, an echo is conveyed back to the receiver and a reflection into other regions, in particular into regions in which a distinction from the radiation reflected by the surface can only be made with difficulty, is prevented. The sunken portion is preferably dimensioned according to the lower irradiation opening in the housing. The sunken portion is preferably designed channel-like. A through-flow of the medium to be investigated can thus take place in the sunken portion. The sunken portion is preferably disposed beneath a mounting area for the housing. In another preferred embodiment of the invention, the arrangement for influencing the ultrasound signal is provided at the bottom of the device, in particular in the sunken portion. In this way, an identifier is impressed into the echo, so that a reliable distinction is thus possible between the signal reflected by the liquid surface and the signal reflected by the bottom and the evaluation electronics can thus reliably distinguish between the reflected signals. In a preferred embodiment, the arrangement for influencing the ultrasound signal is designed as an edge. In another preferred embodiment, the arrangement for influencing the ultrasound signal is designed as a stack of layers. It is thus possible to generate a phase shift in the reference signal, which produces unambiguity of the signal. Another possibility for the embodiment of the arrangement for influencing the ultrasound signal is a two-stage and/or split reference reflector.

Overall, interference effects of the two partial echoes then arise with the superimposition to form a characteristic signal pattern in the reference echo.

Alternatively, the echoes from the reflector and from the liquid surface can also be distinguished by the different propagation times.

In another preferred development of the invention, the device is designed as a flange for mounting at the underside of a liquid container, in particular an oil tank. The flange preferably comprises a flange group with a sealing ring, a reference distance and an ultrasonic transducer including the circuitry logic, which is disposed in an integrated switching circuit.

Figure 2:
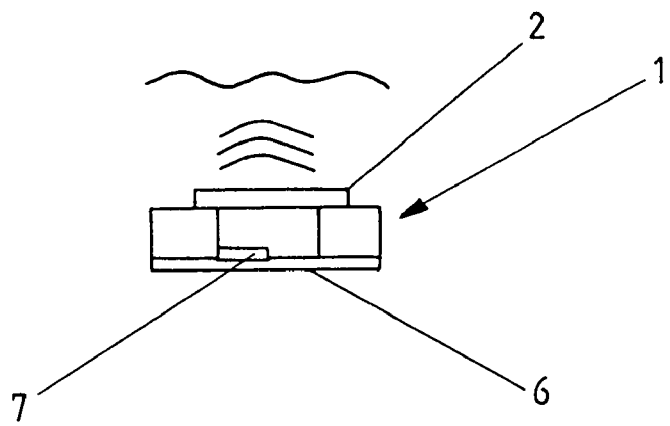
Figure 3:
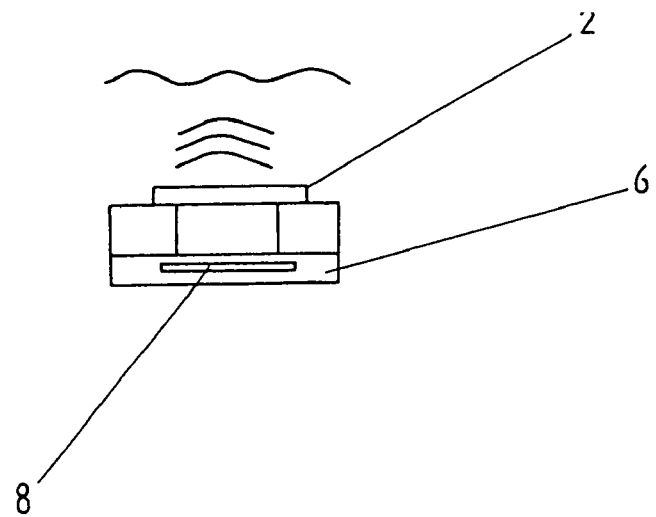
Figure 4:
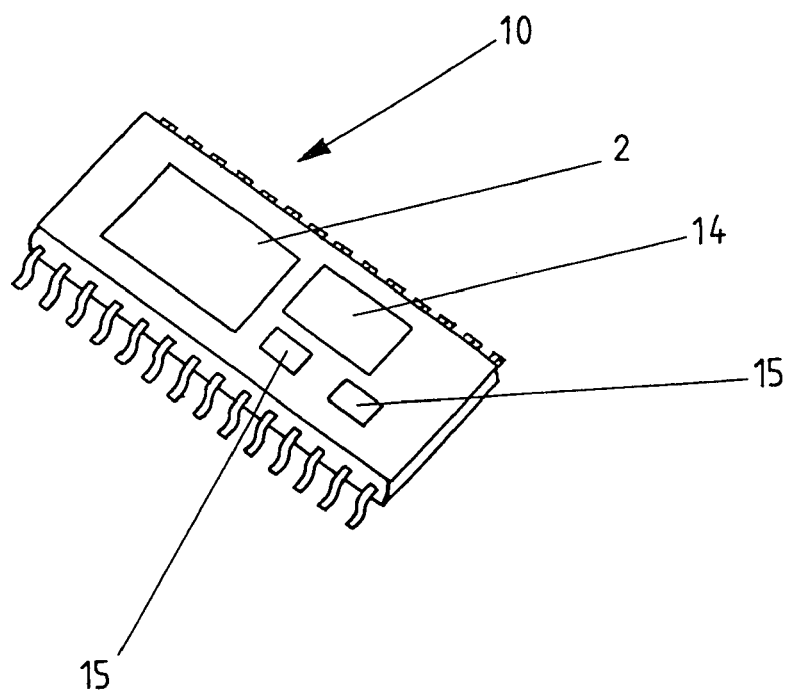
Figure 5:
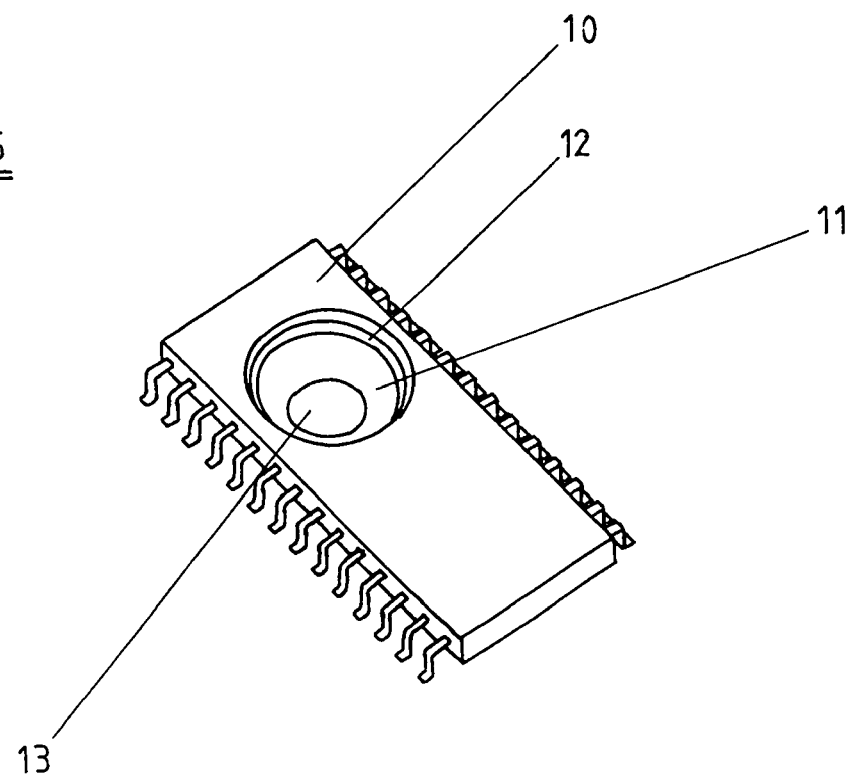
Figure 6:
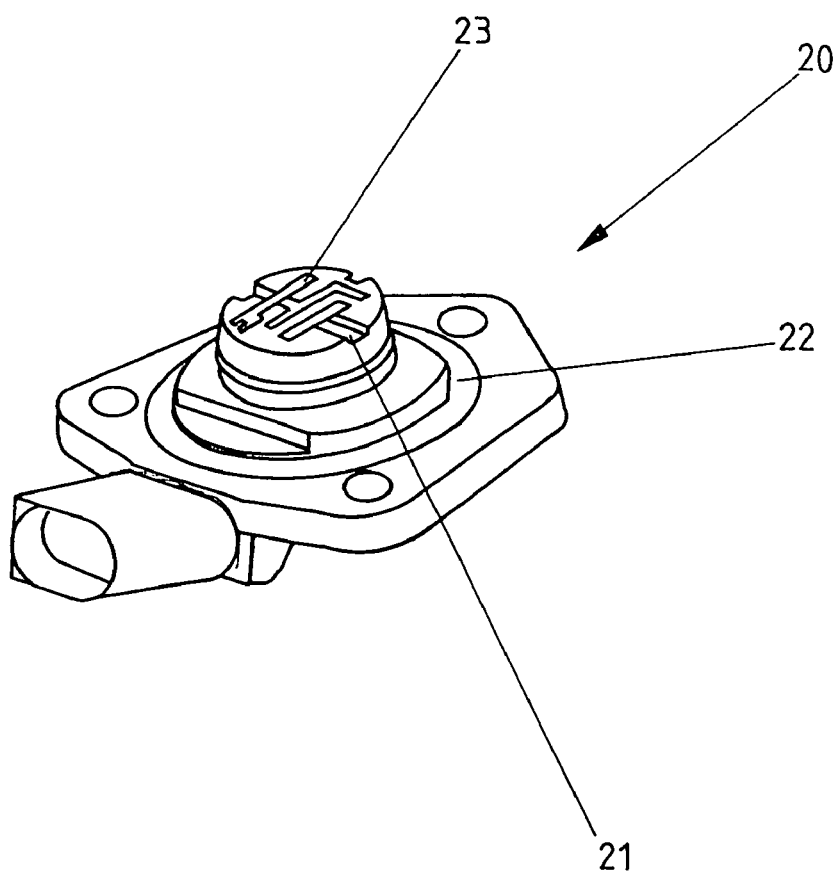

The invention is explained further below with the aid of an example of embodiment represented in the drawing. In detail, the schematic representations show in:

FIG. 1: a schematic representation of the principle of the device according to the invention;

FIG. 2: a schematic representation of a special embodiment of the device according to the invention;

FIG. 3: an alternative embodiment of the device from FIG. 2 according to the invention;

FIG. 4: a schematic representation of a housing of the device according to the invention with a plurality of components accommodated therein;

FIG. 5: a perspective view of a specially adapted housing for the device according to the invention; and FIG. 6: a flange for the formation of the device according to the invention and for the mounting of a housing for example according to FIG. 4 or 5.

FIG. 1 shows schematically a device 1 with an ultrasonic transducer 2, which radiates sound waves 3 to a liquid surface 4. Liquid surface 4 forms of a boundary layer between the medium to be investigated, in particular oil, and a gas lying above the latter, in particular air. A reflection of sound waves 3 takes place at this boundary layer, so that reflected sound wave 3 is thrown back onto the ultrasonic transducer as an echo. Ultrasonic transducer 2 is formed by a piezoceramic, which can also serve as a transmitter and receiver. Ultrasonic transducer 2 is disposed at a distance from the bottom of the liquid container, in particular the oil container, so that sound waves 5 are also radiated at the rear side by ultrasonic transducer 2 and are reflected at a rear-side reflector 6, in particular at the bottom of the container. It has already been indicated in FIG. 1 that ultrasonic transducer 2 is disposed on a flange, in which a channel or sunken portion is provided, in which sound waves 5 radiated at the rear side run and which thus forms a defined reference distance. The liquid, in particular here the oil, flows directly around ultrasonic transducer 2, so that the implemented reference distance with sound waves 5 is also filled with the medium oil. Ultrasonic transducer 2 transmits a time-limited ultrasonic wave packet. This wave packet is reflected at the oil-air interface and is received back at the same ultrasonic transducer after a propagation time t. The propagation distance is determined from the propagation time of the wave packet. The propagation distance is precisely twice as large as the distance between the ultrasonic transducer and the interface between oil and air. In the optimum case, this distance is equal to the level in the liquid container, insofar as the ultrasonic transducer is mounted at the bottom of the container, the transmission surface is identical to the bottom surface and the reflection surface is plane-parallel to the transmission surface. The knowledge of the sound velocity in the measurement medium is necessary for calculating the propagation distance. The latter exhibits, amongst other things, a dependence on the measurement medium and the temperature. The reference distance is thus used to compensate for this influence and to calculate the sound velocity. The sound velocity, which is not known precisely, is determined from the propagation time of the signal reflected at this reflection surface and from the known distance of the reflection surface, or more precisely rear-side reflector 6, from ultrasonic transducer 2.

FIG. 2 shows, as a characteristic feature of device 1, an additional edge 7 in rear-side reflector 6. The effect of this is that the echo signal of the rear-side reflector contains an unambiguous identifier and can thus be distinguished unambiguously from the signal reflected by the liquid surface.

As an alternative to this, a stack of layers 8 is disposed in rear-side reflector 6 in FIG. 3. This stack of layers or layer pack produces a phase shift in the reference signal, which also guarantees unambiguity with regard to distinguishing the reference signal from the echo signal of the liquid surface.

FIG. 4 shows ultrasonic transducer 2, which here is integrated into housing 10 with other components. This housing is designed as an overall sensor element and comprises, apart from ultrasonic transducer 2, an ASIC with temperature detection 14 and a plurality of passive components 15 such as for example capacitors, resistors, diodes, transistors, varistors and/or coils.

FIG. 5 shows housing 10 once again, recess 11 for accommodating ultrasonic transducer 2 being shown here. At the upper side, recess 11 is relatively large and adapted to the shape of ultrasonic transducer 2 to be accommodated. In the lower region, a support element in the form of a ring 12 is provided, on which the ultrasonic transducer is positioned, and furthermore a final layer is provided, which leaves free only a comparatively small opening 13, through which only a fairly small proportion of the sound waves radiated to the rear side pass downwards to the rear-side reflector. The size of this recess is designed such that a signal with the desired energy is radiated downwards.

FIG. 6 shows a flange group 20, which can be mounted at the underside of the liquid container, in particular the oil tank, and on account of an opening in the liquid container is in direct contact with the liquid, in particular the engine oil. An axial rubber gasket 22 closes the system off tightly to the exterior. Flange group 20 has a mounting face 23 for housing 10 with ultrasonic transducer 2. Provided in mounting face 23 is a sunken portion, which here is designed as channel 21. The width of this channel 21 is adapted to the size of lower opening 13 in housing 10.

The invention claimed is:

1. A device for measuring the level of a liquid according to the ultrasound-echo principle in a container with an ultrasonic transducer (2), wherein the ultrasonic transducer (2) is disposed at a distance from a reflecting surface disposed in the bottom region and is designed for irradiation to the liquid surface and to the lower reflecting surface (6),
   wherein a sunken portion (21) in the bottom is disposed beneath the ultrasonic transducer (2) for a reference measurement between the transducer (2) and the bottom of the sunken portion (21), and the device is designed as a flange (20) with a sealing ring (22) for mounting in an opening at the underside of the container; and
   wherein the sunken portion (21) is designed channel-like allowing through-flow of the liquid.

2. The device according to claim 1,
   wherein the ultrasonic transducer (2) also serves as a receiver.

3. The device according to claim 1,
   wherein the ultrasonic transducer (2), a receiver and an evaluation unit are integrated in a component.

4. The device according to claim 1,
wherein the device has a housing with electronic components, in particular an ASIC, integrated therein.

5. The device according to claim 1,
wherein the device has a component with an opening above and an opening below for accommodating the ultrasonic transducer (2).

6. The device according to claim 5,
wherein the lower opening (13) and the upper opening (11) are designed with a different size.

7. The device according to claim 5,
wherein the upper opening (11) and the lower opening (13) are dimensioned corresponding to the energy to be radiated.

8. The device according to claim 4,
wherein the housing is a device for temperature detection (14).

9. The device according to claim 1,
wherein the sunken portion (21) is disposed beneath a mounting face (23) for the housing (10).

10. The device according to claim 1,
wherein an arrangement for influencing the ultrasound signal is provided at the bottom of the device, in particular in the sunken portion (21).

11. The device according to claim 10,
wherein the arrangement for influencing the ultrasound signal is designed as an edge (7).

12. The device according to claim 10,
wherein the arrangement for influencing the ultrasound signal is designed as a stack of layers (8).

13. The device according to claim 1,
wherein the device is designed as a flange (20) for mounting at the underside of a container.

* * * * *